United States Patent
Tsirkin et al.

(10) Patent No.: US 10,061,622 B2
(45) Date of Patent: *Aug. 28, 2018

(54) UPDATING MEMORY TOPOLOGY INFORMATION FOR VIRTUAL MACHINES

(71) Applicant: Red Hat Israel, Ltd., Raanana (IL)

(72) Inventors: Michael Tsirkin, Raanana (IL); Andrea Arcangeli, Imola (IT)

(73) Assignee: Red Hat Israel, Ltd., Raanana (IL)

( * ) Notice: Subject to any disclaimer, the term of this patent is extended or adjusted under 35 U.S.C. 154(b) by 500 days.

This patent is subject to a terminal disclaimer.

(21) Appl. No.: 13/777,887

(22) Filed: Feb. 26, 2013

(65) Prior Publication Data
US 2014/0244891 A1    Aug. 28, 2014

(51) Int. Cl.
*G06F 3/06*     (2006.01)
*G06F 9/50*     (2006.01)

(52) U.S. Cl.
CPC ............ *G06F 9/5077* (2013.01); *G06F 3/067* (2013.01); *G06F 3/0611* (2013.01); *G06F 3/0635* (2013.01)

(58) Field of Classification Search
CPC ................ G06F 3/0635; G06F 2212/2542
See application file for complete search history.

(56) References Cited

U.S. PATENT DOCUMENTS

| | | | |
|---|---|---|---|
| 5,493,663 A | 2/1996 | Parikh | |
| 5,918,249 A | 6/1999 | Cox et al. | |
| 6,769,017 B1 | 7/2004 | Bhat et al. | |
| 7,222,221 B1 | 5/2007 | Agesen et al. | |
| 7,421,575 B2 | 9/2008 | Ang et al. | |
| 7,434,002 B1 | 10/2008 | Zedlewski et al. | |
| 7,707,379 B2 * | 4/2010 | Bartley | G06F 13/161 711/100 |
| 8,392,661 B1 | 3/2013 | Metcalf | |
| 8,656,397 B2 | 2/2014 | Eidus et al. | |
| 2002/0087652 A1 * | 7/2002 | Davis | G06F 9/5016 709/213 |
| 2005/0033948 A1 * | 2/2005 | Wei | 713/1 |
| 2006/0236070 A1 | 10/2006 | Wang et al. | |

(Continued)

OTHER PUBLICATIONS

E-mail message to QEMU development mailing list: http://lists.gnu.org/archive/html/qemu-devel/2011-11/msg02946.html (Nov. 23, 2011).

(Continued)

*Primary Examiner* — Ann J Lo
*Assistant Examiner* — Leandro R Villanueva
(74) *Attorney, Agent, or Firm* — Lowenstein Sandler LLP (57) ABSTRACT

Systems and methods for providing dynamic topology information to virtual machines hosted by a multi-processor computer system supporting non-uniform memory access (NUMA). An example method may comprise assigning, by a hypervisor executing on a computer system, unique identifiers to a plurality of memory blocks residing on a plurality of physical nodes; determining that a memory block has been moved from a first physical node to a second physical node; determining memory access latency values to the second physical node by a plurality of virtual processors of the computer system; and updating, using a unique identifier of the memory block, a data structure storing memory access latency information, with the memory access latency values for the memory block.

20 Claims, 8 Drawing Sheets

(56) References Cited

U.S. PATENT DOCUMENTS

| | | | |
|---|---|---|---|
| 2007/0226449 A1* | 9/2007 | Akimoto | 711/170 |
| 2007/0233967 A1* | 10/2007 | Rangarajan et al. | 711/147 |
| 2009/0006805 A1 | 1/2009 | Anderson et al. | |
| 2009/0037585 A1 | 2/2009 | Miloushev et al. | |
| 2009/0089780 A1* | 4/2009 | Johnson et al. | 718/1 |
| 2009/0157935 A1 | 6/2009 | Worthington et al. | |
| 2009/0187713 A1 | 7/2009 | Zedlewski et al. | |
| 2009/0313445 A1 | 12/2009 | Pandey et al. | |
| 2009/0320022 A1 | 12/2009 | Ries et al. | |
| 2010/0058346 A1 | 3/2010 | Narang et al. | |
| 2010/0229177 A1 | 9/2010 | Chung et al. | |
| 2010/0251234 A1* | 9/2010 | Oshins | 718/1 |
| 2010/0325383 A1 | 12/2010 | Karamcheti et al. | |
| 2011/0016290 A1 | 1/2011 | Chobotaro et al. | |
| 2011/0066790 A1 | 3/2011 | Mogul et al. | |
| 2011/0072234 A1 | 3/2011 | Chinya et al. | |
| 2011/0247000 A1 | 10/2011 | Eidus et al. | |
| 2011/0296406 A1* | 12/2011 | Bhandari et al. | 718/1 |
| 2014/0245295 A1* | 8/2014 | Tsirkin et al. | 718/1 |

OTHER PUBLICATIONS

Advanced Configuration and Power Interface Specification, Hewlett-Packard Corporation: http://www.acpi.info/DOWNLOADS/ACPIspec50.pdf pp. 17-24, 44-45, 101-105, 151-155, 174-177, 293-298, and 631-633 (Dec. 6, 2011).

Office Action issued in U.S. Appl. No. 12/750,251 dated Jun. 5, 2012.

Response to Office Action in U.S. Appl. No. 12/750,251 dated Sep. 5, 2012.

Office Action issued in U.S. Appl. No. 12/750,251 dated Jan. 2, 2013.

Response to Office Action in U.S. Appl. No. 12/750,251 dated Mar. 1, 2013.

Co-pending U.S. Appl. No. 13/777,881, filed Feb. 26, 2013.

"Hsieh et al., Computation Migration: Enhancing Locality for Distributed-Memory Parallel Systems, ACM SIGPLAN Notices, vol. 28 Issue 7, Jul. 1993".

"Bertozzi et al., Supporting task migration in multi-processor systems-on-chip: a feasibility study, Date '06 Proceedings of the conference on Design, automation and test in Europe (2006)".

"Mu et al., Interactive Locality Optimization on NUMA Architectures, In Proceedings of the ACM Symposium on SoftwareVisualization, Jun. 2003".

USPTO; Office Action for U.S. Appl. No. 13/777,881, dated Dec. 18, 2014.

USPTO; Office Action for U.S. Appl. No. 13/777,881, dated Jun. 3, 2015.

Notice of Allowance for U.S. Appl. No. 12/750,251 dated Oct. 8, 2013.

USPTO, Office Action for U.S. Appl. No. 13/777,881, dated Dec. 30, 2015.

U.S. Appl. No. 13/777,881, filed Feb. 26, 2013, Providing Dynamic Topology Information in Virtualized Computing Environments.

* cited by examiner

FIG.1

SRAT 200

| 210 Proximity Domain | 220 Resource |
|---|---|
| 0 | Processor 0 |
| 0 | Memory 0 |
| 1 | Processor 1 |
| 1 | Memory 1 |
| 2 | Processor 2 |

FIG. 2

SLIT 300

|   | 0 | 1 | 2 | 3 | 4 |
|---|---|---|---|---|---|
| 0 | 10 | 20 | 30 | 40 | 255 |
| 1 | 20 | 10 | 20 | 30 | 255 |
| 2 | 30 | 20 | 10 | 20 | 30 |
| 3 | 40 | 30 | 20 | 10 | 20 |
| 4 | 255 | 255 | 30 | 20 | 10 |

| Proximity Domain | Resource |
|---|---|
| 0 | 130a |
| 1 | 130b |
| 2 | 130c |
| 3 | 130d |
| 4 | 130e |
| 5 | 130f |
| 6 | 130g |
| 7 | 130h |
| 8 | 190a |
| 9 | 190b |
| 10 | 190c |
| 11 | 190d |

FIG. 5

|    | 0  | 1  | 2  | 3  | 4  | 5  | 6  | 7  | 8  | 9  | 10 | 11 |
|----|----|----|----|----|----|----|----|----|----|----|----|----|
| 0  | 10 |    |    |    |    |    |    |    |    |    |    |    |
| 1  | 10 | 10 |    |    |    |    |    |    |    |    |    |    |
| 2  |    | 20 | 20 |    |    |    |    |    |    |    |    |    |
| 3  |    | 20 | 20 | 10 | 10 |    |    |    |    |    |    |    |
| 4  |    |    |    | 10 | 30 |    |    |    |    |    |    |    |
| 5  |    |    |    |    | 30 | 20 |    |    |    |    |    |    |
| 6  |    |    |    |    | 10 | 20 | 20 |    |    |    |    |    |
| 7  |    |    |    |    |    | 10 | 20 | 20 |    |    |    |    |
| 8  |    |    |    |    |    |    | 10 | 10 | 20 |    |    |    |
| 9  |    |    |    |    |    |    |    | 10 | 30 | 30 |    |    |
| 10 |    |    |    |    |    |    |    |    | 10 | 20 | 20 | 10 |
| 11 |    |    |    |    |    |    |    |    |    |    | 20 | 20 |

FIG. 6a

|    | 0  | 1  | 2  | 3  | 4  | 5  | 6  | 7  | 8  | 9  | 10 | 11 |
|----|----|----|----|----|----|----|----|----|----|----|----|----|
| 0  | 10 | 10 | 20 | 20 | 20 | 30 | 30 | 30 | 10 | 20 | 20 | 30 |
| 1  |    | 10 | 30 | 30 | 10 | 20 | 20 | 20 | 20 | 30 | 10 | 20 |
| 2  |    |    | 10 | 10 | 30 | 20 | 20 | 20 | 20 | 10 | 30 | 20 |
| 3  |    |    |    | 10 | 30 | 20 | 20 | 20 | 20 | 10 | 30 | 20 |
| 4  |    |    |    |    | 10 | 20 | 20 | 20 | 30 | 30 | 10 | 20 |
| 5  |    |    |    |    |    | 10 | 10 | 10 | 30 | 20 | 20 | 10 |
| 6  |    |    |    |    |    |    | 10 | 10 | 30 | 20 | 20 | 10 |
| 7  |    |    |    |    |    |    |    | 10 | 30 | 20 | 20 | 10 |
| 8  |    |    |    |    |    |    |    |    | 10 | 20 | 20 | 30 |
| 9  |    |    |    |    |    |    |    |    |    | 10 | 30 | 20 |
| 10 |    |    |    |    |    |    |    |    |    |    | 10 | 20 |
| 11 |    |    |    |    |    |    |    |    |    |    |    | 10 |

UPDATING MEMORY TOPOLOGY INFORMATION FOR VIRTUAL MACHINES

TECHNICAL FIELD

The present disclosure is generally related to virtualized computer systems, and is more specifically related to systems and methods for providing dynamic topology information to virtual machines.

BACKGROUND

In a multi-processor computer system, a processor may access various memory devices in a number of ways ranging from local memory access via a common bus to foreign memory access via other devices, including other processors. For example, in a symmetric multi-processing (SMP) architecture, processors may directly access all memory devices. However, as the number of processors in a computer system increases, providing an adequate bandwidth for symmetric interconnection between processors and memory devices becomes more and more difficult.

In a non-uniform memory access (NUMA) system, requirements to the bandwidth between processors and memory devices are typically alleviated by connecting each processor directly to some memory devices, while providing the processor with indirect connections (e.g., via other processors) to some other memory devices. Hence, in some situations, NUMA systems may perform better than SMP systems since the aggregate memory access bandwidth usually increases as more nodes are added to the NUMA system, while in the SMP architecture the common bus interconnecting processors and memory devices may become a performance bottleneck.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for providing dynamic memory topology information to a virtual machine hosted by a multi-processor computer system supporting non-uniform memory access (NUMA). According to the NUMA architectural model, a physical processor of a multi-processor computer system may be directly connected to some memory devices while being indirectly connected (e.g., via other processors) to some other memory devices. Overall performance of a NUMA system may be improved by increasing the ratio of local to foreign memory accesses by all processors, since not only foreign memory accesses usually take longer time, but they may also lead to contentions for the resources involved in foreign memory accesses. Local memory accesses may refer to memory accesses via a local bus (e.g., PCI bus). Foreign memory accesses may refer to memory accesses via other devices such as other processors and/or system area networks.

A multi-processor computer system may optimize the system performance by allocating threads and/or processes to physical processors in a manner increasing the ratio of local to foreign memory accesses by the processors. Hence, migrating a memory block to another physical node may cause migrating of one or more virtual processors accessing the memory. The multi-processor computer system may employ various methods to learn the system topology information needed for optimizing thread and/or process allocation to physical processors. The system topology information may include memory access latency values for one or more processors accessing various memory devices, memory pages, and/or memory blocks.

In one illustrative example, the multi-processor computer system may store the system topology information in Static Resource Affinity Table (SRAT) and System Locality Information Table (SLIT). A SRAT may include a plurality of entries associating a processor or a memory block with an integer value identifying a proximity domain. Access latencies between proximity domains may be stored in SLIT.

A memory block may comprise one or more conventional, "large" or "huge" memory pages. "Large" or "huge" memory page refers to a memory page having the size larger than that of a conventional memory page for a given combination of processor architecture and operating system. In certain implementations, the topology notification methods described herein may operate with memory blocks of one or more fixed sizes, while in other implementations the topology notification methods described herein may operate with memory blocks of variable sizes.

A process allocation policy implemented by a multi-processor computer system may include various rules, including, for example, keeping on the same node, whenever possible, a processor and the memory employed by the processor. "Node" herein shall refer to a group of one or more processors and one or more associated memory devices locally accessible by the processors in the group.

The above described policy assumes that the system topology is static which may not be true, especially in a virtualized environment. Virtualization architecture may allow memory block migration between physical nodes, thus changing the memory access latency values for one or more processors.

"Virtualization" herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. A memory block may dynamically migrate between physical nodes, thus changing the memory access latency values for one or more processors, including virtual processors.

Hence, for more efficient process and/or thread allocation to virtual processors in a virtualized system supporting NUMA, the hypervisor should be able to promptly notify a virtual machine of topology changes. To implement this, the hypervisor may, in response to determining that a memory block has been moved from a first physical node to a second physical node, determine the access latency values to the affected memory by one or more processors, including the virtual processors defined in the system, and accordingly update the affected SRAT and/or SLIT entries.

The hypervisor may notify the virtual machine which employs the affected memory of the topology change, e.g., by sending an Advanced Configuration and Power Interface (ACPI) event to the virtual machine, thus allowing the virtual machine more efficiently allocate processes based on dynamic system topology information.

Various aspects of the above referenced methods and systems are described in details herein below by way of examples, rather than by way of limitation.

Figure 1:
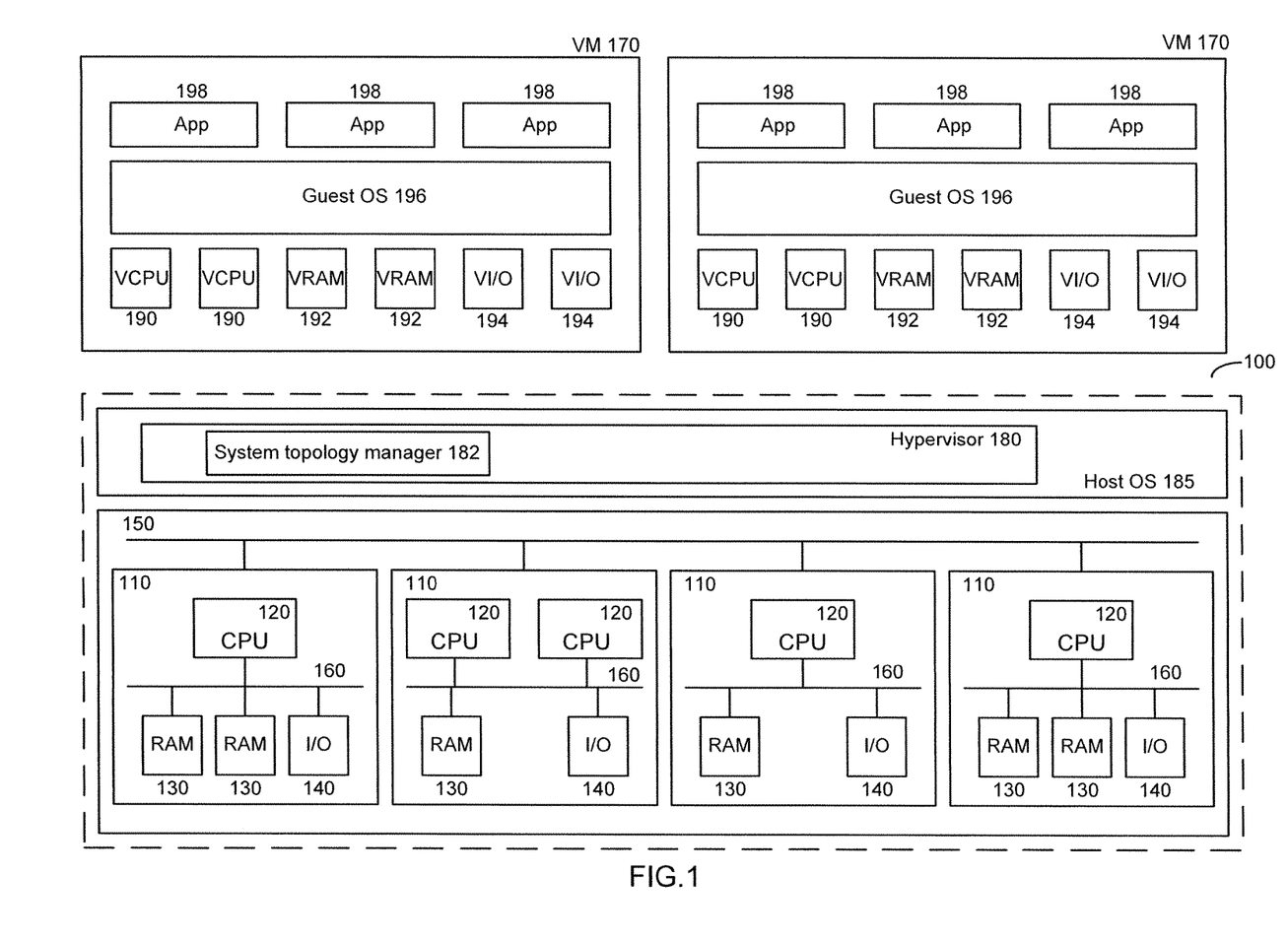
FIG. 1 depicts a high-level component diagram of one illustrative embodiment of a multi-processor computer system 100 in accordance with one or more aspects of the present disclosure.

FIG. 1 depicts a high-level component diagram of one illustrative embodiment of a multi-processor computer system 100 in accordance with one or more aspects of the present disclosure. The computer system 100 may include one or more interconnected nodes 110. Each node 110 may in turn include one or more physical processors 120 communicatively coupled to memory devices 130 and input/output (I/O) devices 140.

"Physical processor" or "processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein shall refer to a volatile or non-volatile memory device, such as RAM, ROM, EEPROM, or any other device capable of storing data. "I/O device" herein shall refer to a device capable of providing an interface between one or more processor pins and an external device capable of inputting and/or outputting binary data.

Processors 120 may be interconnected using a variety of techniques, ranging from a point-to-point processor interconnect to a system area network 150, as shown in FIG. 1. Local connections within each node 110, including the connections between a processor 120 and a memory 130 and between a processor 120 and an I/O device 140 may be provided by one or more local buses 160 of suitable architecture.

As noted herein above, computer system 100 may run multiple virtual machines 170, by executing a software layer 180, often referred to as "hypervisor," above the hardware and below the virtual machines, as schematically shown in FIG. 1. In one illustrative example, the hypervisor 180 may be a component of the operating system 185 executed by the host computer system 100. Alternatively, the hypervisor 180 may be provided by an application running under the host operating system 185, or may run directly on the host computer system 100 without an operating system beneath it. The hypervisor 180 may abstract the physical layer, including processors, memory, and I/O devices, and present this abstraction to virtual machines 170 as virtual devices, including virtual processors 190, virtual memory 192, and virtual I/O devices 194.

A virtual machine 170 may execute a guest operating system 196 which may utilize the underlying virtual devices 190, 192, and 194, each of which may map to a device of the host machine (e.g., a network interface device, a CD-ROM drive, etc.). One or more applications 198 may be running on a virtual machine 170 under the guest operating system 196.

A virtual machine 170 may include multiple virtual processors 190. Processor virtualization may be implemented by the hypervisor 180 scheduling time slots on one or more physical processors 120 such that from the guest operating system's perspective those time slots are scheduled on a virtual processor 190. Memory virtualization may be implemented by a page table (PT) which is a memory structure translating virtual memory addresses to physical memory addresses. A memory block may dynamically migrate between physical nodes, thus changing the memory access latency values for one or more processors, including virtual processors.

To optimize the system performance, the host operating system 185 and/or the hypervisor 180 running on multi-processor host computer system 100 which supports NUMA may dynamically allocate threads and/or processes to physical processors 120 in a manner increasing the ratio of local to foreign memory accesses by processors 120. Since a memory block may dynamically migrate between physical nodes, thus changing the memory access latency values for one or more processors, the hypervisor, for more efficient thread and/or process allocation to virtual processors, should be able to notify the virtual machines of the topology changes.

The host operating system 185 and/or the hypervisor 180 may employ various methods to acquire and store the system topology information needed for optimizing thread and/or process allocation to physical processors. In one illustrative example, the hypervisor may include a system topology manager 182. In response to determining that a memory block has been moved to another physical node, the system topology manager 182 may determine the access latency values to the migrating memory block by one or more virtual processors, and accordingly update one or more data structures employed to store the system topology information. In one illustrative example, the system topology manager 182 may employ Static Resource Affinity Table (SRAT) and System Locality Information Table (SLIT) defined by Advanced Configuration and Power Interface (ACPI) Specification for storing the system topology information.

A SRAT may include a plurality of entries associating a processor or a block of memory with an integer value identifying a proximity domain. "Proximity domain" herein may refer to a collection of devices (e.g., processors and memory devices) such that the processors belonging to the collection have the same access latency to the memory devices belonging to the collection, and that latency value is typically less that the access latency of any processor belonging to the collection accessing any memory outside of the collection. In one illustrative example, processors and memory devices belonging to a single physical node also belong to a single proximity domain. In another illustrative example, processors and memory devices of an SMP system ay be viewed as belonging to a single proximity domain. In yet another illustrative example, processors and memory devices belonging to a first physical node also belong to a first proximity domain, while processors and memory devices belonging to a second physical node also belong to a second proximity domain. Hence, in certain embodiments, a proximity domain identifier may also identify a NUMA physical node, and a SRAT entry may associate a processor or a memory device with a particular NUMA node.

Figure 2:
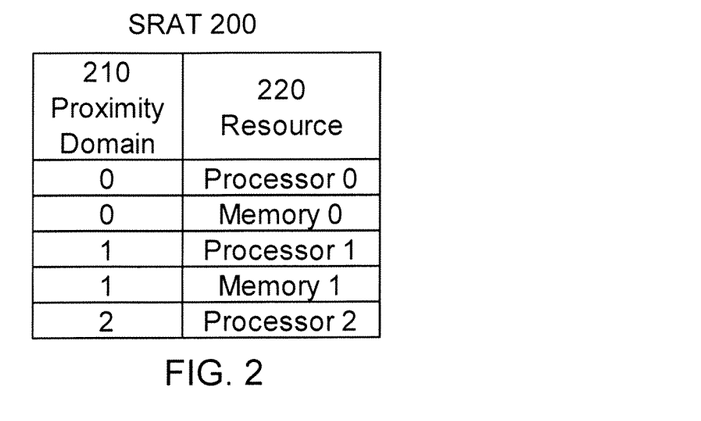
FIG. 2 schematically illustrates one example of a Static Resource Affinity Table (SRAT) structure.

In one illustrative example, the SRAT may include a header that identifies a variable number of entries referred to as Static Resource Allocation Structures. Two types of structures may be used to populate the table entries: Processor Local Affinity Structures and Memory Affinity Structures. A Processor Affinity Structure may identify a specific processor by Advanced Programmable Interrupt Controller (APIC) or Streamlined Advanced Programmable Interrupt Controller (SAPIC) identifier, and associate that processor with a proximity domain. A Memory Affinity Structure may identify a memory block by its base address and length, and associate that memory block with a proximity domain. Each structure may contain other fields and adhere to a specific format prescribed by the ACPI Specification. FIG. 2 schematically illustrates one example of a SRAT structure. A SRAT 200 may include two columns: a proximity domain column 210 and a resource column 220. The system topology manager 182 may populate the proximity domain column 210 with proximity domain identifier values, and populate the resource column 220 with processor identifier values and/or memory block identifier values. Depending on a particular implementation, the SRAT may be stored in a memory as a vector, a two-dimensional array, or a more complex data structure.

Figure 3:
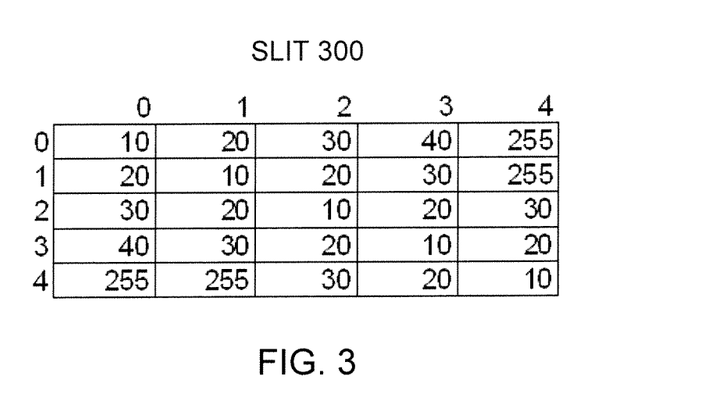
FIG. 3 schematically illustrates one example of a System Locality Information Table (SLIT) structure.

Access latencies between proximity domains may be stored in a SLIT. FIG. 3 schematically illustrates one example of a SLIT structure. A SLIT may be provided by a two-dimensional table 300 storing relative access latencies from one proximity domain to another. Hence, the SLIT value stored within a cell addressable by a pair of integer values (i, j) may represent the relative access latency between i-th and j-th proximity domains. Due to the fact that a SLIT may be symmetrical relative to its leading diagonal, in some implementations the SLIT is not stored as a full two-dimensional matrix but as a different data structure (e.g., a single dimensional array having its elements mapped to a triangular matrix).

In certain embodiments, the access latency to local memory may be represented by an arbitrarily selected integer value, and hence the leading diagonal of the SLIT may be filled by the system topology manager 182 with the same integer value indicating a processor accessing memory within the same proximity domain. In one illustrative example, the value of 10 may be used for the local access latency. In certain embodiments, SLIT entries representing foreign memory access may be filled in with integer values indicating the foreign memory access latency relative to the local memory access. In one illustrative example, the foreign memory access latency which is 1.5 times longer than the local memory access latency would be represented by the value of 15, while the foreign memory access latency which is two times longer than the local memory access latency would be represented by the value of 20. In certain embodiments, the access latency to an unreachable memory may be represented by an arbitrarily selected integer value. In one illustrative example, the value of 255 may be used to represent the access latency to an unreachable memory.

Figure 4:
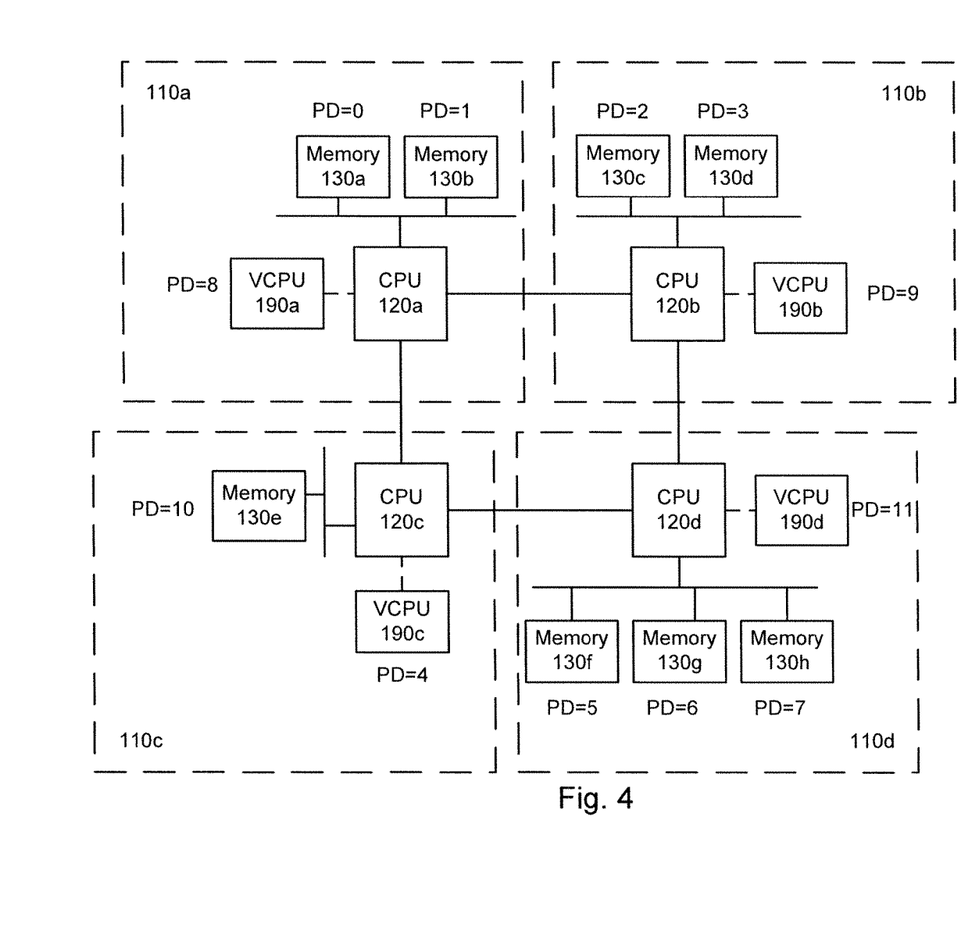
FIG. 4 schematically illustrates one example of physical node configuration in accordance with one or more aspects of the present disclosure.
Figure 5:
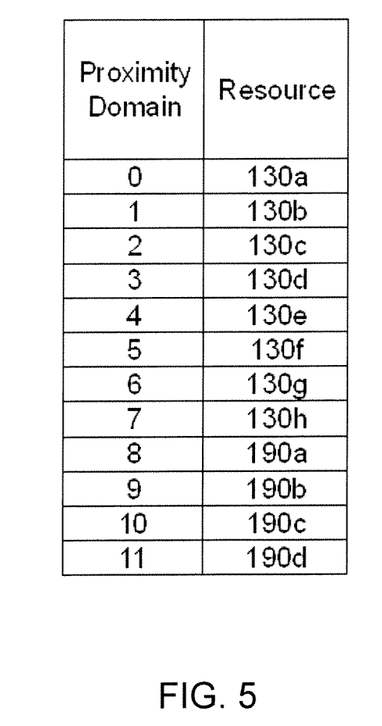
FIG. 5 schematically illustrates one example of a SRAT corresponding to the illustrative physical node configuration of FIG. 4.
Figure 6A:
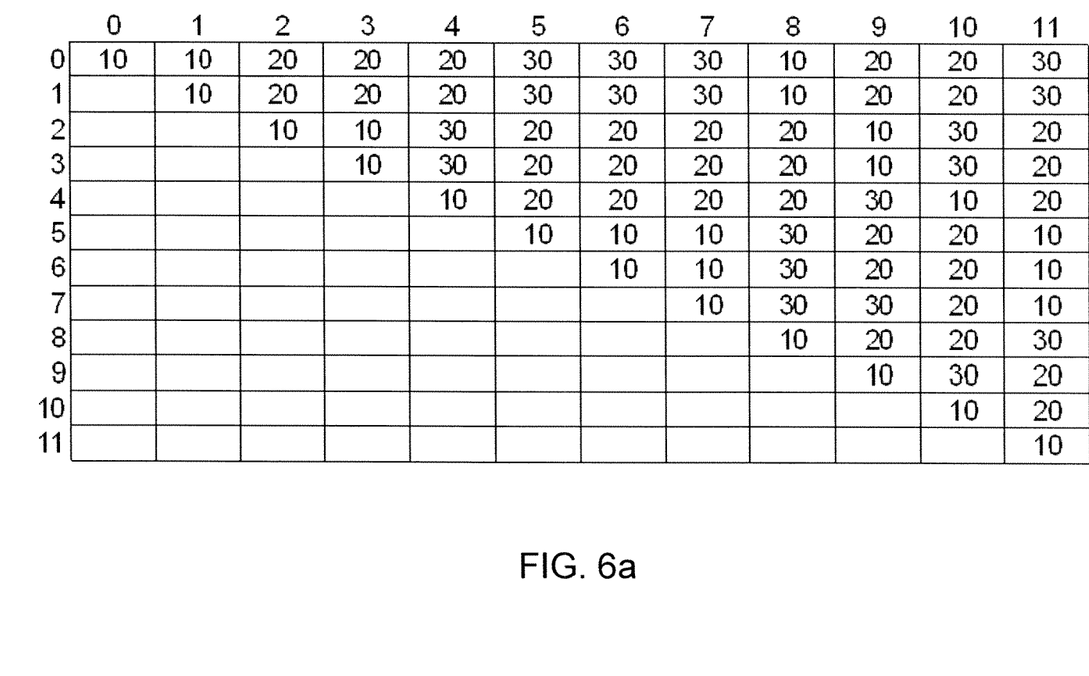
FIGS. 6a-6b schematically illustrate examples of SLITs corresponding to the illustrative physical node configuration defined by FIGS. 4-5.

Since, as noted herein above, a memory block may dynamically migrate between physical nodes, thus changing the memory access latency values for one or more virtual processors, the hypervisor, for more efficient thread and/or process allocation to virtual processors, should be able to notify the guest operating system which "owns" the migrating memory block of the topology changes caused by the memory block migration. To implement the topology notification functionality, the hypervisor may define each memory block as residing in a dedicated proximity domain. FIG. 4 illustrates one example of physical node configuration and memory block allocation to physical nodes, including the memory blocks 130*a* and 130*b* residing on the physical node 110*a*, the memory blocks 130*c* and 130*d* residing on the physical node 110*b*, the memory block 130*e* residing on the physical node 110*c*, and the memory blocks 130*f*, 130*g*, and 130*h* residing on the physical node 110*d*. One example of a SRAT corresponding to the illustrative physical node configuration of FIG. 4 is shown in FIG. 5. In the illustrative example of FIG. 5, the memory blocks 130*a* and 130*b* residing on the physical node 110*a* are assigned to the proximity domains 0 and 1, respectively; the memory blocks 130*c* and 130*d* residing on the physical node 110*b* are assigned to the proximity domains 2 and 3, respectively; the memory block 130*e* residing on the physical node 110*c* is assigned to the proximity domain 4; the memory blocks 130*f*, 130*g*, and 130*h* residing on the physical node 110*d* are assigned to the proximity domains 5, 6, and 7, respectively; and the virtual processors 190*a*-190*d* are assigned to the proximity domains 8-11, respectively. One example of a symmetric SLIT corresponding to the illustrative physical node configuration defined by FIGS. 4-5 is shown in FIG. 6*a*. In certain embodiments, a SLIT corresponding to the illustrative physical node configuration defined by FIGS. 4-5 may be asymmetric. While two or more memory blocks residing on the same physical node may be formally assigned to two or more different proximity domains (due to the above referenced requirement of the uniqueness of the proximity domain identifier assigned to each memory block), the SLIT entries indicating the access latency between those proximity domains may contain the values indicative of local access.

Figure 6B:
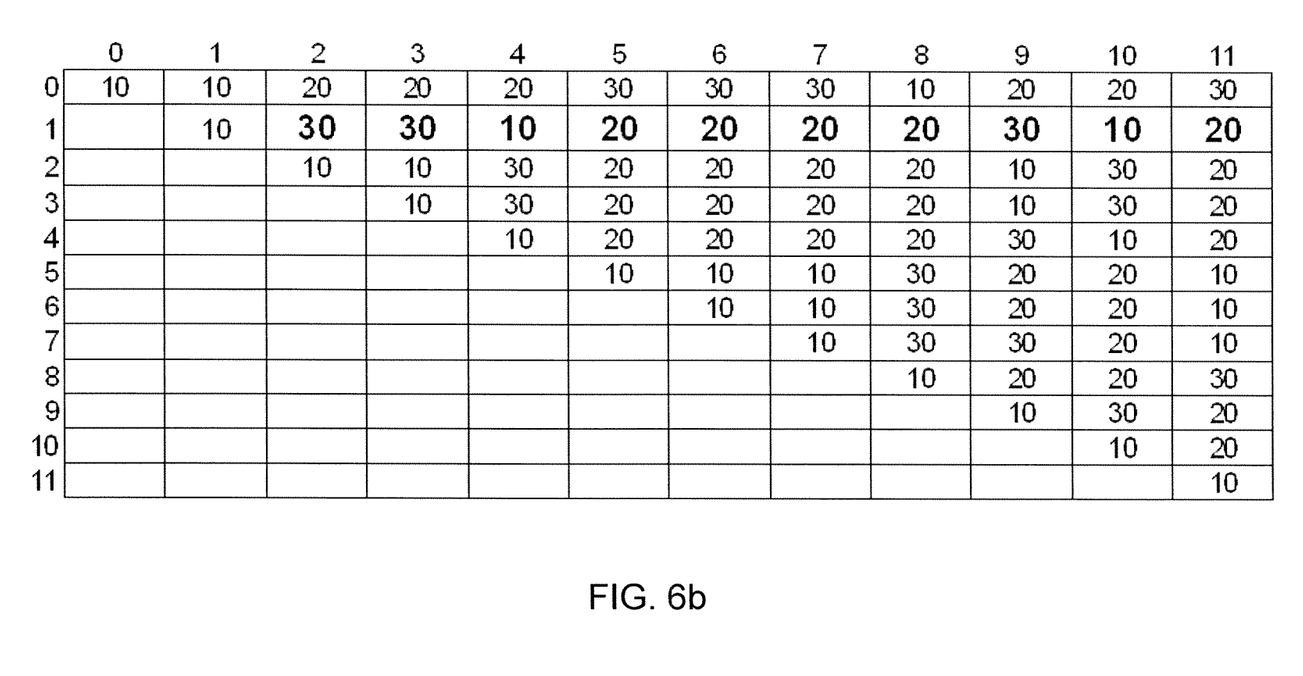

The hypervisor may cause a memory block to migrate from one physical node to another, e.g., due to inability to accommodate a request to increase the block at the current node. Responsive to migrating a memory block from a first physical node to a second physical node, the hypervisor may determine the memory access latency values to the second physical node by one or more virtual processors, and accordingly update the affected SRAT and/or SLIT entries. For example, upon migrating the memory block 130b to the physical node 110c, several SLIT entries may be updated as shown in FIG. 6b.

The hypervisor may notify the virtual machine which employs the affected memory block of the topology change, e.g., by sending an Advanced Configuration and Power Interface (ACPI) event to the virtual machine, so that the latter would be able to more efficiently allocate processes based on dynamic system topology information. ACPI employs two registers to implement its event notification functionality: an event status register and an event enable register. When an event occurs, the ACPI sets a bit in the status register. If the corresponding bit in the enable register is set, ACPI asserts a system control interrupt (SCI) signal to the operating system.

Figure 7:
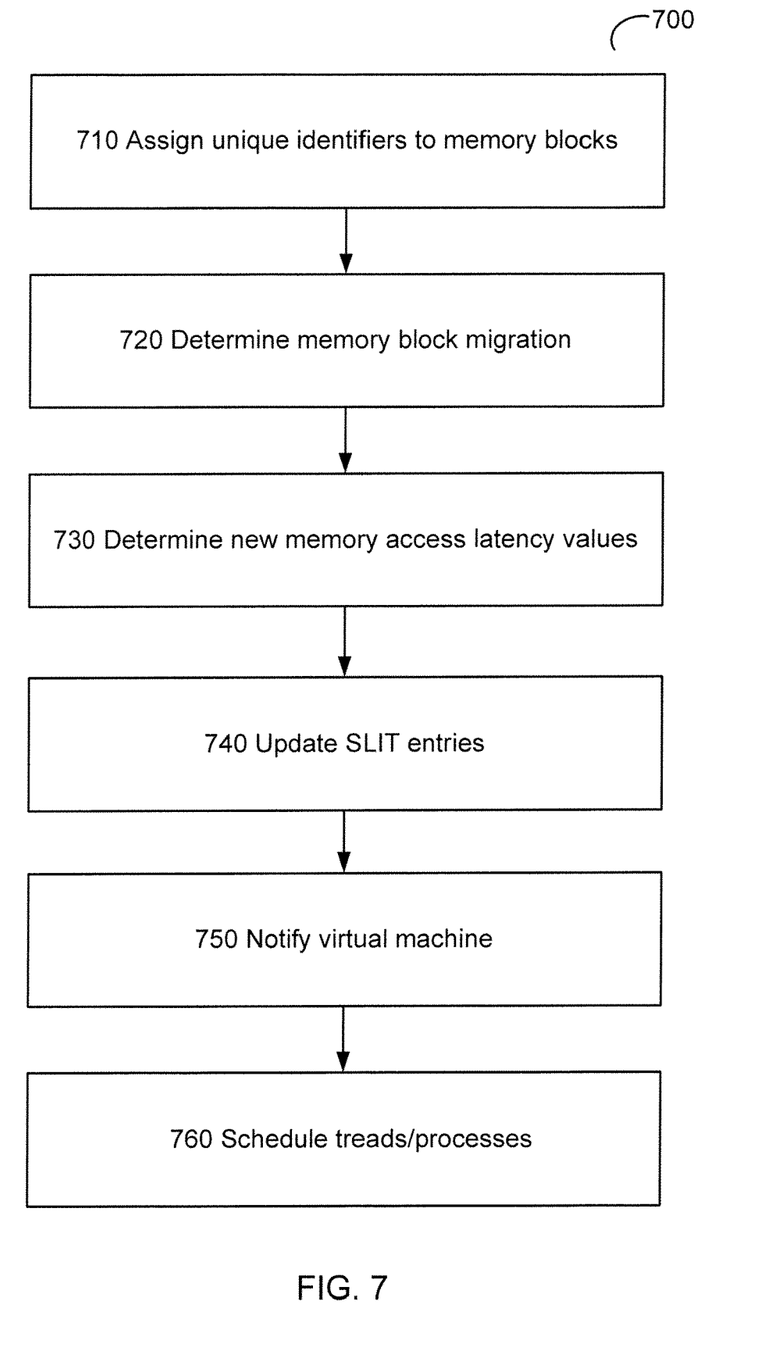
FIG. 7 depicts a flow diagram of a method for providing dynamic topology information to virtual machines in accordance with one or more aspects of the present disclosure.

FIG. 7 depicts a flow diagram of one embodiment of a method 700 for providing dynamic system topology information to virtual machines. The method 700 may be performed by a computer system that may comprise hardware (e.g., circuitry, dedicated logic, and/or programmable logic), software (e.g., instructions executable on a computer system to perform hardware simulation), or a combination thereof. The method 700 and/or each of its individual functions, routines, subroutines, or operations may be performed by one or more physical processors of the computer system executing the method.

At block 710, the hypervisor being executed by a host computer system may assign a unique identifier to each of a plurality of memory blocks. As noted herein above, the unique identifier may be provided by an integer value identifying a NUMA proximity domain. In one example, two or more unique identifiers can be assigned to two or more memory blocks residing on the same physical node. Thus, in one example, memory blocks residing on the same physical node may be assigned to different proximity domains, due to the above referenced requirement of the uniqueness of the proximity domain identifier assigned to each memory block. The SLIT entries storing the memory access latency values between the domains to which the memory blocks residing on the same physical node have been assigned can be initialized with the value indicating local access (e.g., with the value of 10).

At block 720, the hypervisor may determine that one of the memory blocks has been moved from a first physical node to a second physical node.

At block 730, the hypervisor may determine memory access latency values to the memory residing on the second physical node by a plurality of virtual processors defined in the system. In certain embodiments, the memory blocks may be defined by the host computer system in the SRAT, as described in details herein above.

At block 740, the hypervisor may update one or more elements of a data structure employed by the host computer system to store memory access latency information, to reflect the newly determined memory access latency values. In one illustrative example, the hypervisor may update one or more SLIT entries for the affected memory block, as described in details herein above. The SLIT entries to be updated may be identified by the affected memory block's proximity domain identifier.

At block 750, the hypervisor may notify the virtual machine employing the affected memory block of the updated memory access latency values, e.g., by sending an ACPI event to the virtual machine.

At block 760, the virtual machine may re-schedule one or more threads and/or processes to be executed on one or more virtual processors, based on the updated memory access latency values. Upon completing the operations schematically described by block 760, the method may terminate.

Figure 8:
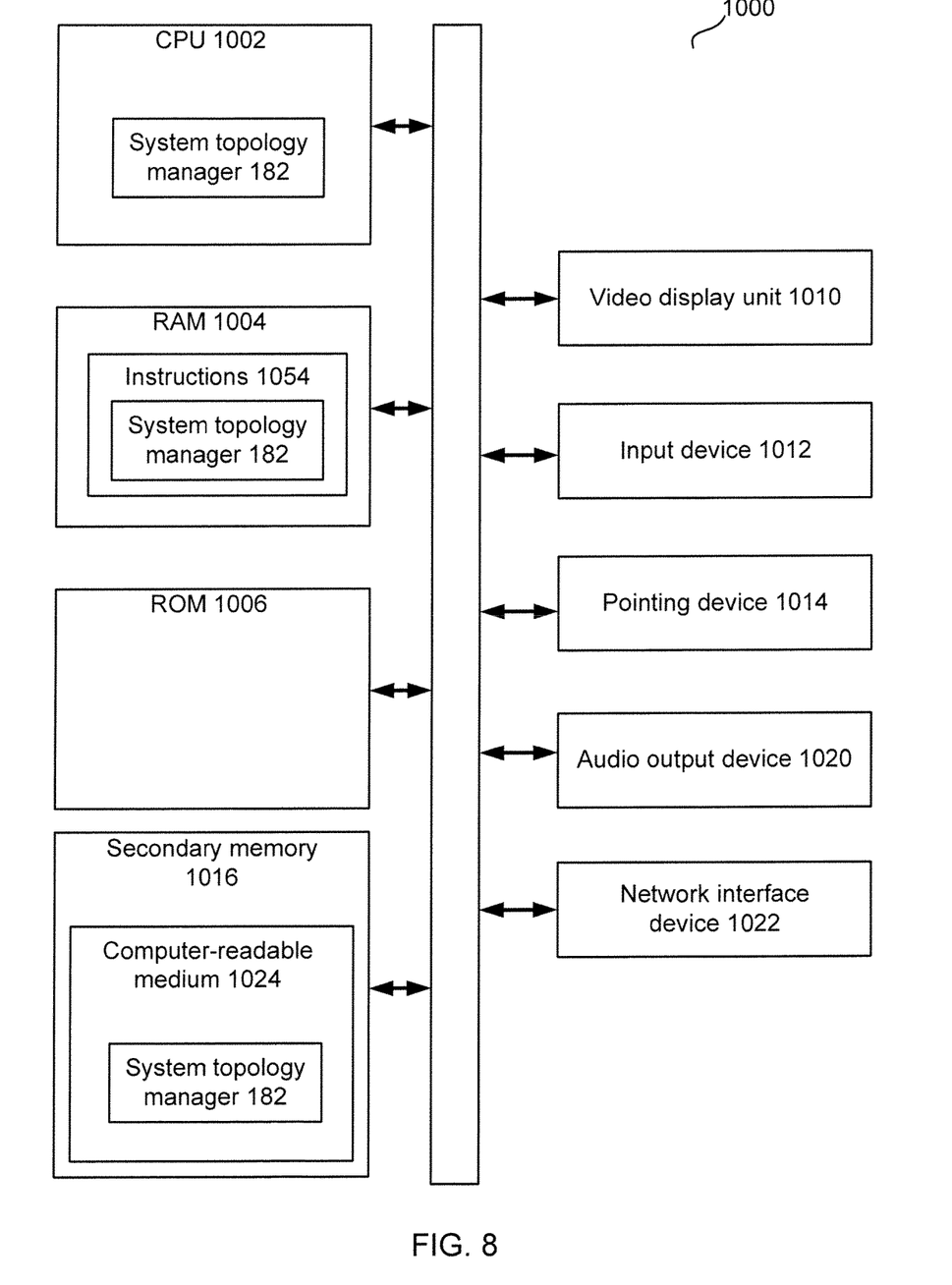
FIG. 8 depicts a block diagram of an illustrative computer system operating in accordance with examples of the present disclosure.

FIG. 8 depicts an example computer system 1000 within which a set of instructions, for causing the computer system to perform any one or more of the methods described herein, may be executed. In certain embodiments, computer system 1000 may correspond to host computer system 100 of FIG. 1.

In certain embodiments, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

The processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

The computer system 1000 may further include a network interface device 1022. The computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

The secondary memory 1016 may include a non-transitory computer-readable storage medium 1024 on which may be stored instructions of the system topology manager 182. Instructions of the system topology manager 182 may also reside, completely or partially, within the main memory 1004 and/or within the processor 1002 during execution thereof by the computer system 1000, hence, the main memory 1004 and the processor 1002 may also constitute machine-readable storage media.

While the computer-readable storage medium 1024 is shown in the illustrative embodiment as a single medium, the term "computer-readable storage medium" shall include a single medium or multiple media (e.g., a centralized or distributed database, and/or associated caches and servers)

that store the one or more sets of executable instructions. The term "computer-readable storage medium" shall also include any non-transitory medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Embodiments described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the embodiments described. The scope of the disclosure should be determined with reference to the following claims, along with the full scope of equivalents to which the claims are entitled.

The invention claimed is:

1. A method, comprising:
   assigning, by a processor, a first proximity domain to a first memory block of a plurality of memory blocks, a second proximity domain to a second memory block of the plurality of memory blocks, a third proximity domain to a first virtual processor on a first physical node of a plurality of physical nodes, and a fourth proximity domain to a second virtual processor residing on a second physical node of the plurality of physical nodes, wherein the first proximity domain, the second proximity domain, the third proximity domain, and the fourth proximity domain are different from each other, and the first memory block and the second memory block reside on the first physical node of the plurality of physical nodes;
   determining that the first memory block has been moved from the first physical node to the second physical node;
   determining memory access latency values to the second physical node for the first virtual processor residing on the first physical node and the second virtual processor residing on the second physical node;
   updating, by the processor, a first entry in a data structure storing memory access latency information to reflect the memory access latency values between proximity domains, the first entry associated with the first proximity domain of the first memory block and the third proximity domain of the first virtual processor; and
   updating, by the processor, a second entry in the data structure, the second entry associated with the first proximity domain of the first memory block and the fourth proximity domain of the second virtual processor.

2. The method of claim 1, further comprising notifying a virtual machine employing the memory block of the memory access latency values.

3. The method of claim 2, wherein the notifying comprises sending an Advanced Configuration and Power Interface (ACPI) event to the virtual machine.

4. The method of claim 1, further comprising scheduling, in view of the memory access latency values, one of a thread or a process to be executed by a virtual machine employing the first memory block.

5. The method of claim 1, wherein the first proximity domain is provided by an identifier in a System Locality Information Table (SLIT).

6. The method of claim 1, wherein the first physical node and the second physical node are represented by different Non-Uniform Memory Access (NUMA) nodes.

7. The method of claim 1, wherein the data structure is provided by a System Locality Information Table (SLIT).

8. The method of claim 1, further comprising assigning proximity domains to at least two memory blocks residing on different physical nodes.

9. The method of claim 1, further comprising initializing, with a value indicating local access, elements of the data structure storing memory access latency information between the first proximity domain of the first memory block and the second proximity domain of the second memory block that reside on the first physical node.

10. The method of claim 1, wherein the first memory block is identified by at least one of: a base address or a size.

11. A computer-readable non-transitory storage medium comprising executable instructions to cause a processor to:
    assign, by the processor, a first proximity domain to a first memory block of a plurality of memory blocks, a second proximity domain to a second memory block of the plurality of memory blocks, a third proximity domain to a first virtual processor on a first physical node of a plurality of physical nodes, and a fourth proximity domain to a second virtual processor residing on a second physical node of the plurality of physical nodes, wherein the first proximity domain, the second proximity domain, the third proximity domain, and the fourth proximity domain are different from each other, and the first memory block and the second memory block reside on the first physical node of the plurality of physical nodes;
    determine that the first memory block has been moved from the first physical node to a second physical node;
    determine memory access latency values to the second physical node for a first virtual processor residing on the first physical node and a second virtual processor residing on the second physical node; and update, by the processor, a first entry in a data structure storing memory access latency information to reflect the memory access latency values between proximity domains, the first entry associated with the first proximity domain of the first memory block and the third proximity domain of the first virtual processor; and update, by the processor, a second entry in the data structure, the second entry associated with the first proximity domain of the first memory block and the fourth proximity domain of the second virtual processor.

12. The computer-readable non-transitory storage medium of claim 11, further comprising executable instructions to cause the processor to notify a virtual machine employing the memory block of the memory access latency values.

13. The computer-readable non-transitory storage medium of claim 11, further comprising executable instructions that cause the processor to notify a virtual machine employing the memory block of the memory access latency values by sending an Advanced Configuration and Power Interface (ACPI) event to the virtual machine.

14. The computer-readable non-transitory storage medium of claim 11, further comprising executable instructions to cause the processor to schedule, in view of the memory access latency values, one of a thread or a process to be executed by a virtual machine employing the first memory block.

15. The computer-readable non-transitory storage medium of claim 11, wherein the first proximity domain is provided by an identifier in a System Locality Information Table (SLIT).

16. A system comprising:
a memory; and
a processor, operatively coupled to the memory, to:
assign a first proximity domain to a first memory block of a plurality of memory blocks, a second proximity domain to a second memory block of the plurality of memory blocks, a third proximity domain to a first virtual processor on a first physical node of a plurality of physical nodes, and a fourth proximity domain to a second virtual processor residing on a second physical node of the plurality of physical nodes, wherein the first proximity domain, the second proximity domain, the third proximity domain, and the fourth proximity domain are different from each other, and the first memory block and the second memory block reside on the first physical node of the plurality of physical nodes;

determine that the first memory block has been moved from the first physical node to a second physical node;

determine memory access latency values to the second physical node for a first virtual processor residing on the first physical node and a second virtual processor residing on the second physical node; and update a first entry in a data structure storing memory access latency information to reflect the memory access latency values between proximity domains, the first entry associated with the first proximity domain of the first memory block and the third proximity domain of the first virtual processor; and update a second entry in the data structure, the second entry associated with the first proximity domain of the first memory block and the fourth proximity domain of the second virtual processor.

17. The system of claim 16, wherein the the processor is further to notify a virtual machine employing the memory block of the memory access latency values.

18. The system of claim 16, wherein the the processors is further to notify a virtual machine employing the memory block of the memory access latency values by sending an Advanced Configuration and Power Interface (ACPI) event to the virtual machine.

19. The system of claim 16, wherein the first proximity domain is provided by an identifier in a System Locality Information Table (SLIT).

20. The system of claim 16, wherein the processor is further to schedule, in view of the memory access latency values, one of a thread or a process to be executed by a virtual machine employing the first memory block.

* * * * *